United States Patent [19]

Nakahata et al.

[11] Patent Number: 5,756,411
[45] Date of Patent: *May 26, 1998

[54] SINTERED BODY OF SILICON NITRIDE AND METHOD OF PRODUCING THE SAME

[75] Inventors: Seiji Nakahata; Akira Yamakawa; Hisao Takeuchi, all of Itami, Japan

[73] Assignee: Sumitomo Electric Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 696,823

[22] PCT Filed: Dec. 26, 1995

[86] PCT No.: PCT/JP95/02679

§ 371 Date: Aug. 20, 1996

§ 102(e) Date: Aug. 20, 1996

[87] PCT Pub. No.: WO96/20144

PCT Pub. Date: Jul. 4, 1996

[30] Foreign Application Priority Data

Dec. 28, 1994 [JP] Japan .................. 6-327553

[51] Int. Cl.$^6$ .................. C04B 35/591
[52] U.S. Cl. .......... 501/97.1; 501/97.2; 264/647; 264/649; 264/665; 264/683
[58] Field of Search .......... 501/97, 97.1, 97.2; 264/647, 649, 665, 683

[56] References Cited

U.S. PATENT DOCUMENTS

| | | | |
|---|---|---|---|
| 4,687,655 | 8/1987 | Hunold et al. | 501/97 |
| 4,716,133 | 12/1987 | Horiuchi et al. | 501/97 |
| 5,114,888 | 5/1992 | Mizuno et al. | 501/97 |
| 5,126,294 | 6/1992 | Hirosaki et al. | 501/97 |
| 5,344,634 | 9/1994 | Edler | 501/97 |
| 5,387,562 | 2/1995 | Dillinger et al. | 501/97 |

*Primary Examiner*—Karl Group
*Attorney, Agent, or Firm*—Wenderoth, Lind & Ponack

[57] ABSTRACT

The invention reduces the time required for nitriding in the process of reaction sintering for production of a sintered body of silicon nitride, thereby improving productivity, and provides a sintered body of silicon nitride having sufficient compactness and high strength which can be produced by reaction sintering. The sintered body is $Si_3N_4$ having an unpaired electron density of $10^{15}/cm^3$ to $10^{21}/cm^3$. The sintered body is produced through reaction sintering by using a Si powder having an unpaired electron density of $10^{15}$–$10^{20}/cm^3$, which is obtained by annealing a commercially available Si powder at temperatures of 300° to 800° C. in other than nitrogen atmosphere for 3-5 hours. In particular, the sintered body is produced by adding to the so obtained Si powder, together with a sintering assistant, an element having a valence of, particularly, from +1 to +3, the element having a covalent bond radius RM which bears such a relation with the covalent bond radius RSi of Si that (RM - RSi)/RSi<0.5, or a compound of the element, as a nitrogen hole producing agent, and subjecting the resulting composite to reaction sintering.

19 Claims, 2 Drawing Sheets

SINTERED BODY OF SILICON NITRIDE AND METHOD OF PRODUCING THE SAME

TECHNICAL FIELD

The present invention relates to a sintered body of silicon nitride ($Si_3N_4$) and a method of producing the same.

BACKGROUND ART

Reaction sintering has been known as one of the methods for production of a sintered body of silicon nitride wherein a shaped body of silicon (Si) powder is nitrified and sintered at the same time in a nitrogen atmosphere. However, in order to obtain a sintered body of silicon nitride by causing a shaped body composed of pure Si powder to react with nitrogen, it is necessary that the shaped body be subjected to a prolonged process of nitriding which extends for more than 100 hours as stated in, for example, J. Mater. Sci. 22 (1987), pp. 3041–3086, more particularly, pp. 3074–3075. In this way, reaction sintering has involved a large drawback of low productivity.

Methods for accelerating the process of nitriding through addition of a nitriding promotor, such as Ni, Co, Ti, or Zr, to Si powder have been proposed in Japanese Patent Publication No. 61-38149, Japanese Patent Application Laid-Open No. 5-330921, and Japanese Patent Application Publication No. 5-508612. According to these methods, an amorphous $SiO_2$ layer on the surface of the Si powder reacts with the nitriding promotor to turn into liquid phase so that the rate of nitrogen diffusion is increased. Thus, it is considered that the process of nitriding is accelerated accordingly. According to JPA Laid-Open No. 5-330921 in particular, time required for nitriding can be reduced to about 8 hours.

However, in these methods which use a nitriding promotor, the coefficient of nitrogen diffusion within the $Si_3N_4$ layer formed on the inner side of the liquid phase on the surface of Si powder is insignificant so that any further inward nitrogen diffusion and any further $Si_3N_4$ creation are prevented. Therefore, any further reduction in the time required for nitriding could not be expected. Further, as described in JPA Laid-Open No. 5-330921, complex procedures of temperature control are required such that nitriding treatment is carried out in several steps at intervals of 50° C. under high temperature conditions on the order of 1200° to 1450° C. As such, it can hardly be said that such method has good productivity advantage.

Further, sintered bodies of $Si_3N_4$ as produced under the reaction sintering techniques using such nitriding promoters have been found unsuitable for use as structural material, because they are not sufficiently compact in texture having a porosity of 4 to 11 vol. %, and because their strength characteristic is rated poor with a three-point bending strength of 460 MPa.

In view of these problems of the prior art, it is an object of the present invention to reduce the time required for the process of nitriding in reaction sintering for production of a sintered body of silicon nitride, thus improving productivity, and to provide a sintered body of silicon nitride having sufficient compactness and high strength which can be produced by reaction sintering.

DISCLOSURE OF THE INVENTION

In order to accomplish the foregoing object, the present invention provides a sintered body of silicon nitride produced by reaction sintering of Si powder, characterized in that its unpaired electron density is $10^{15}/cm^3$–$10^{21}/cm^3$.

To produce the sintered body of silicon nitride of the present invention, reaction sintering is carried out using a Si powder having an unpaired electron density of $10^{15}/cm^3$–$10^{20}/cm^3$. Si powder having unpaired electrons within such a density range can be obtained by annealing any commercially available Si powder at temperatures of 300°–800° C. in other than nitrogen atmosphere for 1 to 5 hours. The atmosphere for this process is preferably air, hydrogen, argon, their mixtures, or a vacuum of not more than 10 torr.

For the sintered body of silicon nitride according to the invention, a sintering assistant and a nitrogen vacancy producing agent powder are added to a Si powder having an unpaired electron density as mentioned above, and their composite is subjected to reaction sintering.

More specifically, in the method of producing a sintered body of silicon nitride according to the invention, a Si powder having an unpaired electron density within the above mentioned range is loaded with a compound of at least one kind of element selected from among rare earth element, Al, Mg, and Ca, as a sintering assistant in an amount of 0.1 to 15 mol %, preferably 0.5 to 10 mol %, in terms of element value, and an element other than a rare earth element, Al, Mg, and Ca having a valence of from +1 to +4, preferably +1 to +3, the element having a covalent bond radius RM which is in such a relationship with the covalent bond radius RSi of Si as (RM-RSi)/RSi<0.5, or a compound of the element, as a nitrogen vacancy producing agent in an amount of 0.5 to 15 mol %, preferably 1 to 10 mol %, in terms of element value, and the resulting composite is subjected to reaction sintering.

A specific example of nitrogen vacancy producing agent is at least one kind of element selected from among Sc, Ni, V, Cr, Mn, Fe, Co, Cu, Ti, Zn, Ga, and Ge, or a compound thereof, preferably alkoxide, stearate, or laurate of any such element.

In conventional reaction sintering of silicon nitride, the presence of two impediments against nitrogen diffusion, namely, an amorphous $SiO_2$ layer formed on the surface of Si powder and a $Si_3N_4$ layer formed on Si powder as a result of nitriding, is responsible for such long time process of nitrogen treatment being required as already mentioned.

BEST MODE FOR CARRYING OUT THE INVENTION

According to the present invention, two characteristic steps are adopted in order to overcome the aforesaid two impediments against nitrogen diffusion, whereby considerable improvements have been successfully achieved such that the rate of nitrogen diffusion is increased and the time required for nitriding is substantially reduced. The two characteristic steps are the step of introducing silicon vacancies into Si powder, a material powder to be used, and the step of creating nitrogen vacancies within $Si_3N_4$.

Figure 1:
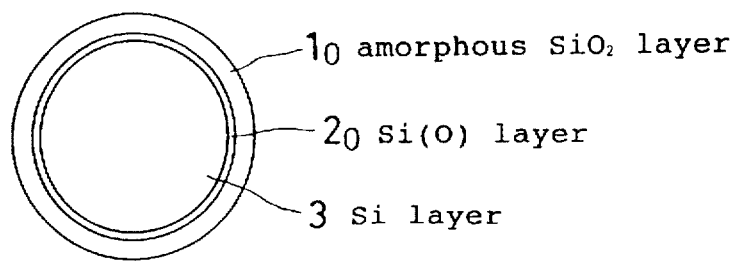
FIG. 1 is a schematic view of a commercially available Si powder.

A commercially available Si powder is believed to be of three-layer construction as shown in FIG. 1. That is, the powder consists of a surface layer or amorphous $SiO_2$ layer $1_0$ formed as a result of spontaneous oxidation of Si, a Si(O) layer $2_0$ located inward thereof and having an oxygen solid solution phase formed in Si, and an innermost Si layer 3. The surface amorphous $SiO_2$ layer $1_0$ inhibits inward diffusion of nitrogen as earlier stated. In the middle layer or Si(O) layer $2_0$, solid solution oxygen is present between lattices, and inter-lattice oxygen increases lattice constant of Si.

Figure 2:
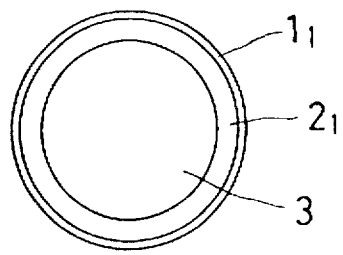
FIG. 2 is a schematic view of a Si powder having its Si(O) layer increased in thickness by heat treatment.
Figure 3:
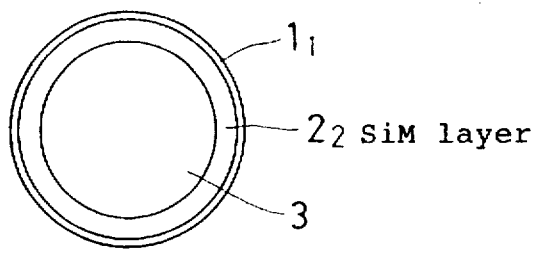
FIG. 3 is a schematic view of a Si powder having a SiM layer such that an impurity element M is dissolved as solid in a Si(O) layer.

According to the invention, therefore, in order to inhibit any increase in the lattice constant of Si(O) layer $2_0$, silicon vacancies are created. Specifically, commercial silicon powder is subjected to proper heat treatment or the like and, as FIG. 2 shows, the oxygen in the surface amorphous $SiO_2$ layer $1_1$ is caused to diffuse inward thereby to reduce the thickness of the amorphous $SiO_2$ layer $1_1$ and increase the thickness of the Si(O) layer $2_1$ so that a large number of silicon vacancies are present therein. It is believed that such silicon vacancies are operative to increase the rate of diffusion of elements dissolved as solid in Si.

Next, nitrogen vacancies will be explained which are created within $Si_3N_4$ lattice in order to increase the speed of nitrogen diffusion within $Si_3N_4$ created by nitriding. The $Si_3N_4$ lattice is so configured as to permit +4 valent Si and −3 valent N to be kept electrically neutral. When elements of, for example, +1 to +3 valence are dissolved as solid within the $Si_3N_4$ lattice, an element having plus charge will occupy lattice points of Si and create nitrogen vacancies in order to retain its electric neutrality.

For example, when M ions of +3 valence become dissolved as solid by X in a $Si_3N_4$ crystal, the formation of nitrogen vacancies may be expressed by the following reaction formula:

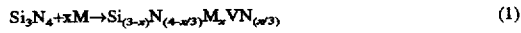  (1)

where VN represents a nitrogen vacancy.

Any $Si_3N_4$ layer having a large number of such nitrogen vacancies will have an increased supply of nitrogen into the Si layer located inward of the $Si_3N_4$ layer, because nitrogen diffusion via the vacancies is accelerated. Thus, it is believed that the speed of nitriding can be dramatically enhanced. In case that ions of +4 valence or higher are dissolved as solid, the quantity of plus charge is excessive; therefore silicon vacancies, rather than nitrogen vacancies, are created and any drastic increase in nitriding speed is no longer expectable. However, even when M ions of 4 valence, which is the same with $Si^{4+}$, are added, only using a nitrogen vacancy producing agent having an RM larger than RSi and giving an unpaired electron density range of $10^{15}/cm^3$ to $10^{20}/cm^3$ to the Si powder, for example, will produce an effect of suppressing any increase in the lattice constant of Si, as will be described later. In this case, although the result would not be comparable to that of elements of +1 to +3 valence, yet the nitrogen diffusion is accelerated so that the time required for nitriding can be shortened.

In the present invention, it is desirable to use elements of, particularly, +1 to +3 valence. In this case, aforesaid Si(O) layer 2 is utilized to dissolve those elements of +1 to +3 valence as solid in the $Si_3N_4$ which has been formed through nitriding. That is, the element is dissolved as solid in silicon vacancies which exist in multiplicity in the Si(O) layer 2. Where quantity z of such element M is dissolved as solid in silicon vacancies, the following reaction formula holds:

  (2)

where Vsi represents a silicon vacancy.

Figure 4:
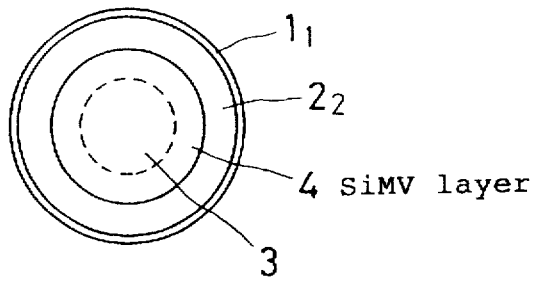
FIG. 4 is a schematic view of a Si powder having a SiMV layer such that impurity element M is diffused into a Si layer.

In this invention, therefore, Si powder in such condition consists mainly of $Si(O)_{(1-y)}M_zVsi_{(y-z)}$ layer (hereinafter referred to as SiM layer) $2_2$, and an interior Si layer 3. As diffusion progresses further, quantity u of M is diffused from SiM layer $2_2$ into Si layer 3, whereby $Si_{(1-u)}M_u$ layer is formed. In this case, if the covalent bond radius of element M is larger than that of Si, as FIG. 4 shows, creation of silicon vacancies is accelerated to inhibit the lattice constant of Si from becoming larger and thus $Si_{(1-u-w)}M_uVsi_w$ layer (hereinafter referred to as SiMV layer) 4 is created.

The nitriding treatment causes SiM layer $2_2$ and SiMV layer 4 of the powder to react respectively in manner as the following reaction formulas indicate:

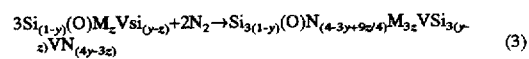  (3)

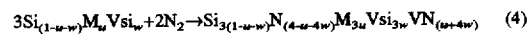  (4)

In the formulas, VN represents a nitrogen vacancy; and M is of +3 valence.

As may be appreciated from the foregoing reaction formulas, nitrogen vacancies are created in either $Si_3N_4$ layer, it being thus expectable that the rate of nitrogen diffusion will grow larger within the $Si_3N_4$ layer.

As may be understood from the foregoing description, with the prior art methods such that a nitriding promotor is merely added to Si powder, as described in Japanese Patent Publication No. 61-38149, Japanese Patent Application Laid-Open No. 5-330921, and Japanese Patent Application Publication No. 5-508612, the Si(O) layer is so thin that the quantity of nitriding promotor solid solution present therein is insufficient to enable formation of SiM and SiMV layers within the Si powder. Therefore, no nitrogen vacancy is formed within the $Si_3N_4$ layer produced through the process of nitriding. This results in insignificant rate of nitrogen diffusion, which in turn results in a prolonged process of nitriding.

Next, the process of producing a sintered body of $Si_3N_4$ by reaction sintering in accordance with the invention will be explained in detail. Initially, commercial Si powder is annealed at temperatures of 300°–800° C. for 1 to 5 hours. By so doing the oxygen of the amorphous $SiO_2$ layer formed on the powder surface is diffused into Si to form a Si(O) layer in which Si vacancies are present in multiplicity. Provided that the treating atmosphere must be an atmosphere other than nitrogen atmosphere, that is, air, hydrogen or argon, or a vacuum of not more than 10 torr. Treatment in a nitrogen atmosphere results in the formation of a $Si_3N_4$ film on the surface of Si powder, which makes it impracticable to allow the nitrogen vacancy producing agent to be dissolved as solid.

For the formation of a nitrogen vacancy Si(O) layer, it is not only possible to employ the aforesaid annealing technique, but also to use another technique, such as a method for implantation of oxygen ions into Si powder or a method for forcibly including oxygen during bulk Si preparation.

The number of Si vacancies in the Si(O) layer in the Si powder thus obtained can be quantitatively determined as the number of unpaired electrons trapped in Si vacancies within the Si(O) layer by using the electrospin resonance technique (ESR technique). As a result of such measurement, it was found that when the unpaired electron density of Si powder was controlled within the range of $10^{15}$–$10^{20}$/cm$^3$ by aforesaid technique, nitriding reaction in particular could be highly accelerated, as against the unpaired electron density of commercial Si powder which was $10^{12}$–$10^{13}$/cm$^3$.

If the number of unpaired electrons, that is, the number of Si vacancies is smaller than $10^{15}$/cm$^3$, the Si vacancies are insufficient to accelerate the formation of solid solution of the nitrogen vacancy producing agent. If the number of unpaired electrons is larger than $10^{20}$/cm$^3$, the process of nitriding may be accelerated, but the quantity of oxygen in Si crystals is excessively large, so that residual oxygen in $Si_3N_4$ crystals or vacancies therein may cause a decrease in strength, the resulting sintered body of $Si_3N_4$ being nothing but one of such low strength as not more than 800 MPa in three-point bending strength.

Next, the Si powder of high unpaired electron density as obtained in above described manner is mixed with a sintering assistant comprising a compound composed of at least one kind of element selected from among rare earth element, Al, Mg and Ca, and a nitrogen vacancy producing agent, and the mixture is molded into shape. The nitrogen vacancy producing agent is an element other than a rare earth element, Al, Mg, and Ca having a valence of from +1 to +4, desirably from +1 to +3, the element having a covalent bond radius RM which is in such a relationship with the covalent bond radius RSi of Si as (RM-RSi)/RSi<0.5, or a compound of the element.

Elements within above mentioned valence range are likely to become dissolved as solid in Si crystals and are liable to produce nitrogen vacancies. Specifically, Sc, Ni, V, Cr, Mn, Fe, Co, Cu, Ti, Zn, Ga, and Ge may be mentioned as examples of such elements. A nitrogen vacancy producing agent and a sintering assistant may be added in the form of powder, but for purposes of producing an extra large sintered body of $Si_3N_4$, they are preferably added in the form of alkoxide, stearate, or laurate so that they may be uniformly dispersed over the surface of the Si powder.

Preferably, the proportion of the sintering assistant is within the range of from 0.1 to 15 mol % in terms of element value, and the nitrogen vacancy producing agent is within the range of from 0.5 to 15 mol % in terms of element value. If the proportion of the sintering assistant is less than 0.1 mol %, or if the proportion of the nitrogen vacancy producing agent is less than 0.5 mol %, their effect cannot be obtained. If both proportions exceed 15 mol %, such agent may precipitate in a grain boundary to act as a starting point of fracture and this does not permit production of any high strength sintered body having a three-point bending strength of more than 800 MPa.

Finally, the resulting shaped body is nitrided and sintered. The temperature pattern required during the process of nitriding and sintering may be controlled in a very simple manner such that the shaped body is held at a temperature of 1300° to 1400° C. for 2–4 hours and is then held at a temperature of 1500° to 1800° C. for 1–3 hours. By this treatment is it possible to obtain a sintered body of $Si_3N_4$ having a relative density of 99% or more. In particular, where the unpaired electron density of the $Si_3N_4$ sintered body obtained is within the range of $10^{15}$–$10^{21}$/cm$^3$, a high strength feature on the order of 800 MPa in three-point bending strength can be achieved.

EXAMPLE 1

A commercially available Si powder having an unpaired electron density of $7\times10^{12}$/cm$^3$ (A) and a commercially available Si powder having an unpaired electron density of $2\times10^{13}$/cm$^3$ (B) were each used as starting material, and the relationship between heat treat conditions and unpaired electron density was examined with respect to each material.

Samples of commercial Si powder (A) and samples of commercial Si powder (B) were held in different atmospheres including (a) air, (b) hydrogen atmosphere, (c) argon atmosphere, and (d) in a vacuum of 10 torr, at 100° C. intervals in a temperature range of from 100° C. to 900° C., for 5 hours each in the case of Si powder (A) and for 2 hours each in the case of Si powder (B). Thereafter, their unpaired electron density values were measured according to the ESR technique.

For purposes of comparison, samples of same commercial Si powder (A) and same commercial Si powder (B) were held in a nitrogen atmosphere (e), and in a vacuum of 100 torr (f), at 100° C. intervals in a temperature range of from 100° C. to 900° C., for 5 hours each. Thereafter, their unpaired electron density values were measured according to the ESR technique.

Figure 5:
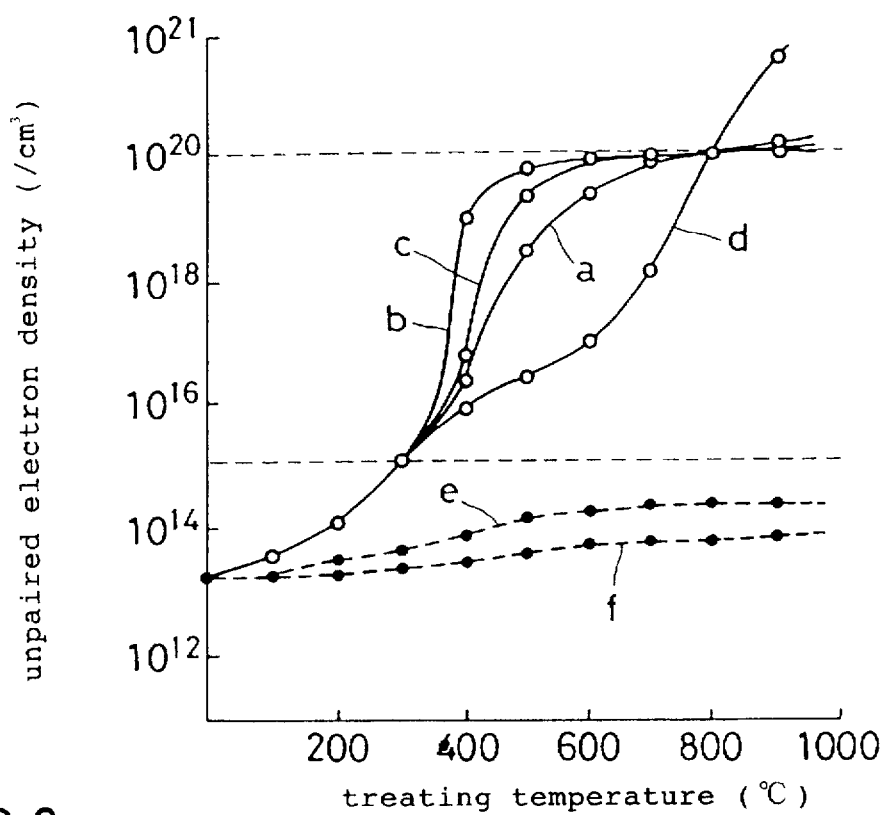
FIG. 5 is a graph showing the relationship between treating temperature for commercially available Si powder having an unpaired electron density of $7\times10^{12}/cm^3$ and the unpaired electron density of the Si powder obtained.
Figure 6:
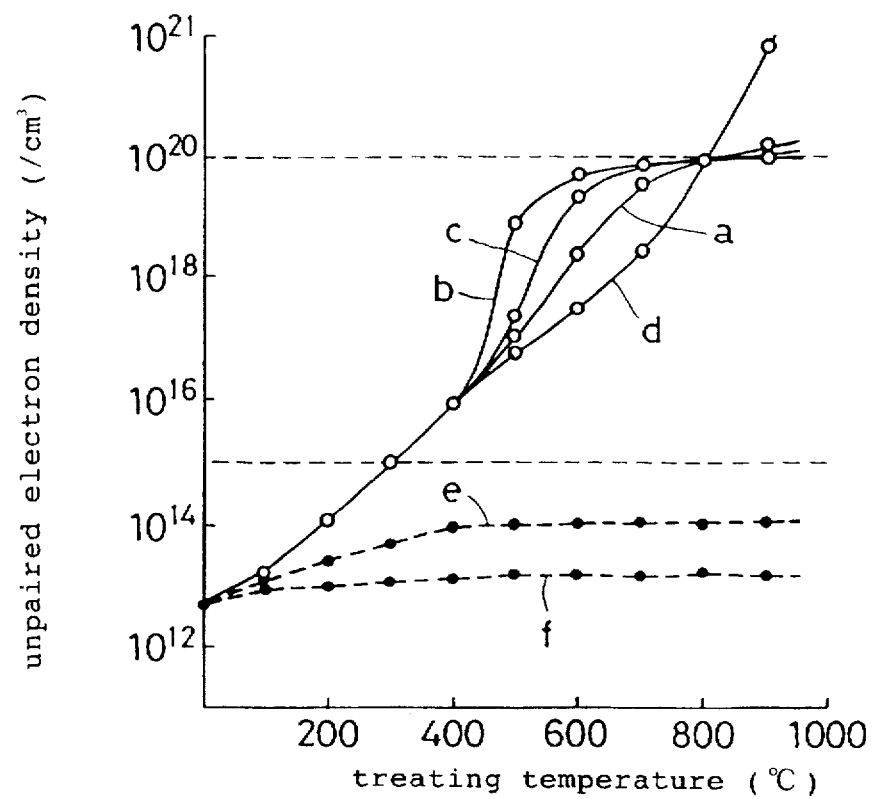
FIG. 6 is a graph showing the relationship between treating temperature for a Si powder having an unpaired electron density of $2\times10^{13}/cm^3$ and the unpaired electron density of the Si powder obtained.

The results are shown in FIG. 5 for commercial Si powder (A) and in FIG. 6 for commercial Si powder (B). As may be understood from the results shown, the unpaired electron density of Si powder can be controlled within the range of $10^{15}$–$10^{20}$/cm$^3$ by heat treating commercial Si powder at 300°–800° C. in other than nitrogen atmosphere, say, in an air, hydrogen or argon atmosphere or in a vacuum of not more than 10 torr.

EXAMPLE 2

Samples of commercial Si powder (A) were subjected to heat treatment under such atmospheres and conditions as shown in Table 1 below. Unpaired electron density values of the so treated Si powder samples are also shown in Table 1.

It is noted that when the Si powders (A) and (B) were batch-processed for less than 1 hour under the same temperatures and atmospheres as No. 2 to No. 5 of Table 1, respectively, the unpaired electron density was below $10^{15}$/cm$^3$ at some places around the center of batch bulk, though the unpaired electron density fell upon $10^{15}$/cm$^3$ as a whole of batch for both Si powders (A) and (B). From this result, it can be understood that the Si powders must be treated for at least 1 hour at temperatures of 300°–800° C. in order to achieve reliable control for the unpaired electron density to fall within the range of $10^{15}$ to $10^{20}$/cm$^3$ over the entire batch of commercial Si powders.

TABLE 1

| Sample | Heat treat conditions | | Unpaired electron density |
|---|---|---|---|
| | Atmosphere | °C. × hr | (/cm$^3$) |
| 1 | Ar | 300 × 5 | $1 \times 10^{15}$ |
| 2 | Air | 500 × 1 | $1 \times 10^{16}$ |
| 3 | Vacuum | 500 × 5 | $4 \times 10^{16}$ |
| 4 | Hydrogen | 600 × 4 | $8 \times 10^{19}$ |
| 5 | Ar | 800 × 5 | $1 \times 10^{20}$ |
| 6 | Ar | 600 × 1 | $9 \times 10^{19}$ |
| 7* | Untreated | | $7 \times 10^{12}$ |
| 8* | Ar | 200 × 3 | $1 \times 10^{14}$ |
| 9* | Air | 900 × 3 | $2 \times 10^{20}$ |
| 10* | Nitrogen | 600 × 3 | $2 \times 10^{14}$ |

TABLE 1-continued

| | Heat treat conditions | | Unpaired electron density |
|---|---|---|---|
| Sample | Atmosphere | °C. × hr | (/cm$^3$) |

(Note) In the table, samples bearing * relate to Comparative Examples. The vacuum for Sample 3 is 10 torr.

Added to each Si powder thus obtained were 3 mol % of $Y_2O_3$ powder and 5 mol % of $Al_2O_3$ powder as sintering assistants, and further added 2 mol % of Cu powder as a nitrogen vacancy producing agent. A thermoplastic resin binder, 4 mol %, was added to the mixture and mixed together, and the resulting mixture was molded into shape by a dry press. Treatment for binder removal was carried out in a nitrogen stream at 600° C. for 2 hours. It is noted in the above connection that between the covalent bond radius RM of Cu and the covalent bond radius RSi of Si there is a relation: (RM-RSi)/RSi=0.5.

Next, each shaped body was subjected to nitriding treatment at 1350° C. in a nitrogen stream for 2 hours and was then sintered at a temperature of 1700°–1800° C. for 1–3 hours as shown in Table 2. Features of respective $Si_3N_4$ sintered bodies, including unpaired electron density, relative density, and three-point bending strength, are shown in Table 2.

TABLE 2

| Sample | Sinter conditions (°C. × hr) | Unpaired electron density (/cm$^3$) | Relative density (%) | 3-point bend strength (MPa) |
|---|---|---|---|---|
| 1 | 1700 × 3 | 2 × 10$^{15}$ | 99 | 1390 |
| 2 | 1800 × 3 | 7 × 10$^{16}$ | 99 | 1300 |
| 3 | 1800 × 3 | 2 × 10$^{16}$ | 99 | 1426 |
| 4 | 1700 × 3 | 9 × 10$^{19}$ | 99 | 1230 |
| 5 | 1800 × 3 | 8 × 10$^{20}$ | 99 | 1230 |
| 6 | 1700 × 1 | 8 × 10$^{20}$ | 99 | 1090 |
| 7* | 1700 × 3 | 2 × 10$^{14}$ | 92 | 560 |
| 8* | 1700 × 3 | 7 × 10$^{14}$ | 91 | 680 |
| 9* | 1700 × 3 | 4 × 10$^{21}$ | 99 | 780 |
| 10* | 1700 × 3 | 9 × 10$^{14}$ | 89 | 430 |

(Note) In the table, samples bearing * mark relate to Comparative Examples.

It may be appreciated from the foregoing that by holding commercial Si powder at 300°–800° C. in other than nitrogen atmosphere for 1–5 hours, the unpaired electron density of the Si powder can be controlled within the range of $10^{15}$–$10^{20}$/cm$^3$ in a uniform, concentration-evened state in the processed powder, and that by using the Si powder in combination with a sintering assistant and a nitrogen vacancy producing agent and subjecting the same to reaction sintering, a sintered body of $Si_3N_4$ can be obtained which has a relative density of 99% or more and a three-point bending strength of 1000 MPa or more.

EXAMPLE 3

Aforesaid commercial Si powder (A) was heat treated at 500° C. in air for 2 hours, and a Si powder having an unpaired electron density of 8×10$^{15}$/cm$^3$ was obtained. Also, commercial Si powder (B) was heat treated at 500° C. in an argon atmosphere for 4 hours, and a Si powder having an unpaired electron density of 2×10$^{19}$/cm$^3$ was obtained.

Further, for comparative purposes, commercial Si powder (A) was heat treated at 500° C. in air for 3 hours, and a Si powder having an unpaired electron density of 1×10$^{16}$/cm$^3$ was obtained. Also, commercial Si powder (B) was heat treated at 500° C. in an argon atmosphere for 4 hours, and a Si powder having an unpaired electron density of 2×10$^{19}$/cm$^3$ was obtained.

Added to each Si powder thus obtained were 3 mol % of $Y_2O_3$ powder and 5 mol % of $Al_2O_3$ powder as sintering assistants, and further added such a nitrogen vacancy producing agent in such a proportion as shown in Table 3 below. The type of Si powder used for each experiment is shown in Table 3 below, together with its unpaired electron density, kind of nitrogen vacancy producing agent used (in powder form), the valence thereof, the ratio of its covalence bond radius RM to covalence bond radius of Si, i.e., (RM-RSi)/RSi value, and the quantity of the agent loaded.

TABLE 3

| Sample | Si powder | Unpaired electron density (/cm$^3$) | Nitrogen vacancy producing agent | | | Loading (mol %) |
|---|---|---|---|---|---|---|
| | | | Kind | Valence | (RM - RSi)/RSi | |
| 11 | A | 8 × 10$^{15}$ | $Sc_2O_3$ | +3 | 0.46 | 2 |
| 12 | A | 8 × 10$^{15}$ | NiO | +2 | 0.12 | 2 |
| 13 | A | 8 × 10$^{15}$ | $V_2(OC)$ | +3 | 0.21 | 2 |
| 14 | A | 8 × 10$^{15}$ | CrN | +3 | 0.14 | 2 |
| 15 | A | 8 × 10$^{15}$ | MnO | +2 | 0.14 | 2 |
| 16 | A | 8 × 10$^{15}$ | $Fe_2O_3$ | +3 | 0.14 | 2 |
| 17 | A | 8 × 10$^{15}$ | CuO | +2 | 0.12 | 2 |
| 18 | A | 8 × 10$^{15}$ | CoO | +2 | 0.13 | 2 |
| 19 | B | 2 × 10$^{19}$ | $Ti_4O_3N_2$ | +3 | 0.15 | 2 |
| 20 | B | 2 × 10$^{19}$ | ZnO | +2 | 0.24 | 2 |
| 21 | B | 2 × 10$^{19}$ | ZnO | +2 | 0.24 | 2 |
| 22 | B | 2 × 10$^{19}$ | $Ga_2O$ | +1 | 0.27 | 2 |
| 23 | B | 2 × 10$^{19}$ | GeO | +2 | 0.23 | 2 |
| 24 | A | 1 × 10$^{16}$ | Unloaded | — | — | — |
| 25 | A | 1 × 10$^{16}$ | MoC | +4 | 0.25 | 5 |
| 26 | A | 1 × 10$^{16}$ | $ZrO_2$ | +4 | 0.44 | 5 |

TABLE 3-continued

| Sample | Si powder | Unpaired electron density (/cm$^3$) | Nitrogen vacancy producing agent | | | Loading (mol %) |
|---|---|---|---|---|---|---|
| | | | Kind | Valence | (RM - RSi)/RSi | |
| 27 | A | 1 × 10$^{16}$ | In$_2$O | +1 | 0.50 | 5 |
| 28 | B | 2 × 10$^{19}$ | PbO | +2 | 0.58 | 5 |
| 29 | B | 2 × 10$^{19}$ | PbO | +2 | 0.58 | 5 |

Each lot of Si powder and the sintering assistant and nitrogen vacancy producing agent added thereto were mixed together and compounded into shape in the same manner as in Example 2. Then, each shaped body thus formed was subjected to nitriding treatment in a nitrogen stream at a temperature of 1300° to 1350° C. for 2–4 hours as shown in Table 4 below. Thereafter, sintering was carried out at a temperature of 1600° to 1800° C. for 1–3 hours as shown in Table 4. Features of respective Si$_3$N$_4$ sintered bodies thus obtained, including unpaired electron density, relative density, and three-point bending strength, are shown in Table 4.

TABLE 4

| Sample | Nitriding (°C. × hr) | Sinter conditions (°C. × hr) | Unpaired electron density (/cm$^3$) | Relative density (%) | 3-point bend strength (MPa) |
|---|---|---|---|---|---|
| 11 | 1350 × 2 | 1800 × 3 | 7 × 10$^{16}$ | 99 | 1340 |
| 12 | 1350 × 2 | 1800 × 3 | 2 × 10$^{19}$ | 99 | 1280 |
| 13 | 1350 × 2 | 1800 × 3 | 2 × 10$^{15}$ | 99 | 1420 |
| 14 | 1350 × 2 | 1800 × 3 | 7 × 10$^{16}$ | 99 | 1300 |
| 15 | 1350 × 2 | 1800 × 3 | 2 × 10$^{19}$ | 99 | 1420 |
| 16 | 1350 × 2 | 1700 × 3 | 9 × 10$^{19}$ | 99 | 1250 |
| 17 | 1350 × 2 | 1800 × 3 | 2 × 10$^{15}$ | 99 | 1310 |
| 18 | 1350 × 2 | 1800 × 3 | 7 × 10$^{16}$ | 99 | 1410 |
| 19 | 1350 × 2 | 1800 × 3 | 2 × 10$^{19}$ | 99 | 1270 |
| 20 | 1350 × 2 | 1800 × 3 | 9 × 10$^{19}$ | 99 | 1250 |
| 21 | 1350 × 2 | 1600 × 1 | 9 × 10$^{19}$ | 99 | 1040 |
| 22 | 1350 × 2 | 1800 × 3 | 2 × 10$^{15}$ | 99 | 1410 |
| 23 | 1350 × 2 | 1800 × 3 | 7 × 10$^{16}$ | 99 | 1300 |
| 24 | 1350 × 2 | 1800 × 3 | 3 × 10$^{15}$ | 99 | 810 |
| 25 | 1300 × 4 | 1800 × 3 | 6 × 10$^{15}$ | 99 | 870 |
| 26 | 1300 × 4 | 1800 × 3 | 2 × 10$^{15}$ | 99 | 840 |
| 27 | 1300 × 4 | 1800 × 3 | 2 × 10$^{15}$ | 99 | 820 |
| 28 | 1350 × 2 | 1500 × 3 | 9 × 10$^{15}$ | 99 | 870 |
| 29 | 1350 × 2 | 1700 × 3 | 9 × 10$^{15}$ | 99 | 840 |

As may be understood from the foregoing, by using a Si powder having an unpaired electron density of 10$^{15}$–10$^{20}$/cm$^3$, it is possible to control the unpaired electron density of the resulting Si$_3$N$_4$ sintered body within the range of 10$^{15}$–10$^{21}$/cm$^3$, and thus to obtain a close-grained high-strength sintered body of Si$_3$N$_4$. In particular, by adding, as a nitrogen vacancy producing agent, an element having a valence of from +1 to +3 and a covalent bond radius RM such that its ratio to the covalent bond radius RSi of Si, say, (RM-RSi)/RSi is less than 0.5, and by sintering the mixture, it becomes possible to obtain a sintered body with even higher strength.

EXAMPLE 4

Commercial Si powder (A) was heat treated at 500° C. in air for 3 hours, and a Si powder having an unpaired electron density of 1×10$^{16}$/cm$^3$ was obtained. Also, commercial Si powder (B) was heat treated at 500° C. in an argon atmosphere for 4 hours, and a Si powder having an unpaired electron density of 2×10$^{19}$/cm$^3$ was obtained.

Added to each Si powder thus obtained were such sintering assistant and such nitrogen vacancy producing agent (both in powder form) as shown in Table 5 below. Mixing, molding and binder removal operations were carried out in the same way as in Example 1. It is noted that each nitrogen vacancy producing agent used is an element having a valence of from +1 to +3 and having a covalence bond radius such that its ratio to the covalent bond radius RSi of Si, that is, (RM-RSi)/RSi is less than 0.5, or a compound thereof.

TABLE 5

| | | Sintering assistant | | Nitrogen vacancy producing agent | |
|---|---|---|---|---|---|
| Sample | Si powder | Kind | Total (mol %) | Kind | Loading (mol %) |
| 30 | B | Y$_2$O$_3$ | 0.5 | Cu | 1 |
| 31 | B | Y$_2$O$_3$/MgO | 5 | Cr$_2$C | 1 |
| 32 | B | Pr$_2$O$_3$/Al$_2$O$_3$ | 10 | TiN | 1 |
| 33 | B | Y$_2$O$_3$ | 0.5 | CuO | 5 |
| 34 | B | Y$_2$O$_3$ | 0.5 | TiO$_2$ | 10 |
| 35 | A | Y$_2$O$_3$ | 2.5 | CuO | 2.5 |
| 36 | A | Y$_2$O$_3$/Al$_2$O$_3$ | 7.5 | Cr$_2$C | 2.5 |
| 37 | A | Y$_2$O$_3$/MgO | 5 | TiO$_2$ | 5 |
| 38 | A | Sm$_2$O$_3$/Nd$_2$O$_3$ | 10 | Cr$_2$C | 5 |
| 39 | A | Yb$_2$O$_3$ | 2.5 | TiO$_2$ | 7.5 |
| 40 | A | Yb$_2$O$_3$/Al$_2$O$_3$ | 7.5 | TiN | 7.5 |
| 41 | A | Y$_2$O$_3$/MgO | 5 | V$_2$C | 10 |
| 42 | A | Sm$_2$O$_3$/Nd$_2$O$_3$ | 10 | Cr$_2$N | 10 |

TABLE 5-continued

| Sample | Si powder | Sintering assistant Kind | Total (mol %) | Nitrogen vacancy producing agent Kind | Loading (mol %) |
|---|---|---|---|---|---|
| 43 | B | $Y_2O_3/Al_2O_3$ | 0.4 | Cu | 5 |
| 44 | B | $Sm_2O_3/Nd_2O_3$ | 11 | Cu | 5 |
| 45 | A | $Y_2O_3$ | 0.05 | Cu | 5 |
| 46 | A | $Y_2O_3/Al_2O_3$ | 16 | Cu | 5 |
| 47 | B | $Y_2O_3/Al_2O_3$ | 5 | Cu | 0.4 |
| 48 | A | $Y_2O_3/Al_2O_3$ | 5 | Cu | 16 |

Next, each of the shaped bodies was subjected to nitriding treatment in a nitrogen stream at a temperature of 1300°–1350° C. for 2–4 hours. Then, sintering operation was carried out at a temperature of 1600°–1800° C. for 3 hours. Features of respective sintered bodies of $Si_3N_4$, including unpaired electron density, relative density, and three-point bending strength, are shown in Table 6.

TABLE 6

| Sample | Nitriding (°C. × hr) | Sinter conditions (°C. × hr) | Unpaired electron density (/cm³) | Relative density (%) | 3-point bend strength (MPa) |
|---|---|---|---|---|---|
| 30 | 1300 × 4 | 1800 × 3 | 7 × 10¹⁶ | 99 | 1120 |
| 31 | 1300 × 4 | 1600 × 3 | 2 × 10¹⁹ | 99 | 1050 |
| 32 | 1300 × 4 | 1800 × 3 | 9 × 10¹⁵ | 99 | 1210 |
| 33 | 1350 × 2 | 1700 × 3 | 2 × 10¹⁵ | 99 | 1100 |
| 34 | 1350 × 2 | 1600 × 3 | 7 × 10¹⁶ | 99 | 1100 |
| 35 | 1350 × 2 | 1800 × 3 | 2 × 10¹⁹ | 99 | 1250 |
| 36 | 1350 × 2 | 1800 × 3 | 9 × 10¹⁹ | 99 | 1200 |
| 37 | 1350 × 2 | 1700 × 3 | 2 × 10¹⁵ | 99 | 1100 |
| 38 | 1300 × 3 | 1800 × 3 | 7 × 10¹⁶ | 99 | 970 |
| 39 | 1350 × 2 | 1800 × 3 | 2 × 10¹⁵ | 99 | 1010 |
| 40 | 1350 × 2 | 1800 × 3 | 7 × 10¹⁶ | 99 | 890 |
| 41 | 1350 × 2 | 1600 × 3 | 2 × 10¹⁹ | 99 | 1160 |
| 42 | 1350 × 2 | 1800 × 3 | 9 × 10¹⁹ | 99 | 920 |
| 43 | 1350 × 2 | 1600 × 3 | 8 × 10¹⁵ | 99 | 900 |
| 44 | 1350 × 2 | 1800 × 3 | 2 × 10¹⁵ | 99 | 900 |
| 45 | 1350 × 4 | 1800 × 3 | 8 × 10¹⁶ | 99 | 820 |
| 46 | 1350 × 4 | 1700 × 3 | 9 × 10¹⁵ | 99 | 810 |
| 47 | 1350 × 4 | 1800 × 3 | 3 × 10¹⁶ | 99 | 815 |
| 48 | 1350 × 2 | 1800 × 3 | 3 × 10¹⁹ | 99 | 810 |

From the above results, it is found that a close-grained, higher strength sintered body of $Si_3N_4$ can be obtained if the proportion of the sintering assistant(s), as a whole, is within a range of from 0.1 to 15 mol %, and if the proportion of the nitrogen vacancy producing agent is within a range of from 0.5 to 15 mol %.

EXAMPLE 5

Commercial Si powder (A) was heat treated at 500° C. in air for 3 hours, and a Si powder having an unpaired electron density of $1×10^{16}/cm^3$ was obtained. Also, commercial Si powder (B) was heat treated at 500° C. in an argon atmosphere for 4 hours, and a Si powder having an unpaired electron density of $2×10^{19}/cm^3$ was obtained.

Added to each Si powder thus obtained were such sintering assistant and such nitrogen vacancy producing agent as shown in Table 7 below. Mixing, molding and binder removal operations were carried out in the same way as in Example 1. It is noted that each nitrogen vacancy producing agent used is an element having a valence of from +1 to +3 and having a covalence bond radius such that its ratio to the covalent bond radius RSi of Si, that is, (RM-RSi)/RSi is less than 0.5, or a compound thereof.

TABLE 7

| Sample | Si powder | Sintering assistant Kind | Total (mol %) | Nitrogen vacancy producing agent Kind | Loading (mol %) |
|---|---|---|---|---|---|
| 45 | A | Y (stearate) | 0.5 | Cu (powder) | 5 |
| 46 | A | Y (alkoxide) | 0.5 | Cr (powder) | 5 |
| 47 | A | Y/Al (laurate) | 0.5 | Cu (powder) | 5 |
| 48 | A | $Y_2O_3/Al_2O_3$ (powder) | 5 | Cu (stearate) | 1 |
| 49 | B | $Sm_2O_3/Nd_2O_3$ (powder) | 5 | Cu (alkoxide) | 1 |
| 50 | B | $Y_2O_3$ (powder) | 5 | Cu (laurate) | 1 |
| 51 | B | $Y_2O_3$ (powder) | 0.5 | Cu (alkoxide) | 1 |
| 52 | B | $Y_2O_3$ (powder) | 0.5 | Cu (alkoxide) | 1 |
| 53 | B | $Y_2O_3/Al_2O_3$ (powder) | 8 | Cu (powder) | 0.8 |
| 54 | B | $Y_2O_3/Al_2O_3$ (powder) | 8 | Cu (powder) | 0.8 |
| 55 | B | $Y_2O_3/Al_2O_3$ (powder) | 8 | Cu (powder) | 11 |

Next, each of the shaped bodies was subjected to nitriding treatment in a nitrogen stream at 1350° C. for 2 hours. Then, sintering operation was carried out at a temperature of 1600°–1800° C. for 3 hours as shown in Table 8 below. Features of respective sintered bodies of $Si_3N_4$ obtained, including unpaired electron density, relative density, and three-point bending strength, are shown in Table 8.

TABLE 8

| Sample | Sinter conditions (°C. × hr) | Unpaired electron density (/cm³) | Relative density (%) | 3-point bend strength (MPa) |
|---|---|---|---|---|
| 45 | 1800 × 3 | 2 × 10¹⁹ | 99 | 1200 |
| 46 | 1800 × 3 | 9 × 10¹⁹ | 99 | 1210 |
| 47 | 1800 × 3 | 2 × 10¹⁵ | 99 | 1210 |
| 48 | 1800 × 3 | 2 × 10¹⁶ | 99 | 1190 |
| 49 | 1800 × 3 | 7 × 10¹⁶ | 99 | 1220 |
| 50 | 1800 × 3 | 2 × 10¹⁹ | 99 | 1150 |
| 51 | 1800 × 3 | 9 × 10¹⁹ | 99 | 1200 |
| 52 | 1700 × 3 | 9 × 10¹⁹ | 99 | 880 |
| 53 | 1600 × 3 | 8 × 10¹⁴ | 99 | 860 |
| 54 | 1800 × 3 | 8 × 10¹⁴ | 99 | 820 |
| 55 | 1800 × 3 | 2 × 10¹⁴ | 99 | 820 |

The above results tell that addition of sintering assistant and nitrogen vacancy producing agent in the form of stearate, laurate, or alkoxide is more advantageous than adding in the form of powder in that a smaller amount of such addition can result in production of a higher-strength $Si_3N_4$ sintered body.

INDUSTRIAL APPLICABILITY

According to the present invention, a silicon powder, a material costing about 1/10 of $Si_3N_4$ powder, rather than using the costly $Si_3N_4$ powder is used. As a result, it is possible to provide a close-grained high strength sintered body of silicon nitride at a lower cost by reaction sintering which takes considerably shorter time than a conventional technique.

What is claimed is:

1. A sintered body of silicon nitride having an unpaired electron density of $10^{15}/cm^3$ to $10^{21}/cm^3$, a relative density of 99% or more and a bending strength of 800 MPa or more, produced by reaction sintering silicon powder, wherein the sintered body contains at least one of a rare earth element, Al, Mg and Ca, and a second element other than the rare earth element, Al, Mg and Ca, having a valence of from +1 to +3 and a covalent bond radius RM which is in such a relationship with the covalent bond radius RSi of silicon as (RM-RSi)/RSi<0.5.

2. A sintered body of silicon nitride as defined in claim 1, wherein the second element having a valence of from +1 to +3 is at least one of elements Sc, Ni, V, Cr, Mn, Fe, Co, Cu, Ti, Zn, Ga, and Ge.

3. A sintered body of silicon nitride as defined in claim 1, wherein the sintered body contains 0.1 to 15 mol % of at least one of rare earth element, Al, Mg, and Ca in terms of element value, and 0.5 to 15 mol % of the second element having a valence of from +1 to +3 in terms of element value.

4. A sintered body of silicon nitride as defined in claim 1, wherein the sintered body contains 0.5 to 10 mol % of at least one of rare earth element, Al, Mg, and Ca in terms of element value, and 1 to 10 mol % of the second element having a valence of from +1 to +3 in terms of element value.

5. A sintered body of silicon nitride as defined in claim 2, wherein the sintered body contains 0.1 to 15 mol % of at least one of rare earth element, Al, Mg, and Ca in terms of element value, and 0.5 to 15 mol % of the second element having a valence of from +1 to +3 in terms of element value.

6. A sintered body of silicon nitride as defined in claim 2, wherein the sintered body contains 0.5 to 10 mol % of at least one of rare earth element, Al, Mg, and Ca in terms of element value, and 1 to 10 mol % of the second element having a valence of from +1 to +3 in terms of element value.

7. A method of producing a sintered body of silicon nitride having a relative density of 99% or more and a bending strength of 800 MPa or more, which comprises annealing a commercially available silicon powder in a temperature range of from 300 to 800° C. in other than nitrogen atmosphere for 1 to 5 hours to obtain a silicon powder having an unpaired electron density of $10^{15}/cm^3$ to $10^{20}/cm^3$, mixing said silicon powder with a compound of at least one of a rare earth element, Al, Mg and Ca as a sintering assistant and a second element other than the rare earth element, Al, Mg and Ca, having a valence of from +1 to +3 and a covalent bond radius RM which is in such a relationship with the covalent bond radius RSi of silicon as (RM-RSi)/RSi<0.5 as a nitrogen vacancy producing agent, and then subjecting the resultant mixture to reaction sintering.

8. A method of producing a sintered body of silicon nitride as defined in claim 7, wherein the atmosphere is of air, hydrogen, or argon, or a vacuum of not more than 10 torr.

9. A method of producing a sintered body of silicon nitride as defined in claim 7, wherein the nitrogen vacancy producing agent is at least one element selected from among Sc, Ni, V, Cr, Mn, Fe, Co, Cu, Ti, Zn, Ga, and Ge, or a compound thereof.

10. A method of producing a sintered body of silicon nitride as defined in claim 7, wherein the sintering assistant and/or nitrogen vacancy producing agent is an oxide, nitride, carbide, alkoxide, stearate, or laurate of any such element as aforementioned.

11. A method of producing a sintered body of silicon nitride as defined in claim 7, wherein the resultant mixture of silica powder with the sintering assistant and nitrogen vacancy producing agent is subjected to nitriding treatment while being kept at 1300°–1400° C. in a nitrogen atmosphere, the nitrided product being then sintered at 1500°–1800° C.

12. A method of producing a sintered body of silicon nitride as defined in claim 8, wherein the resultant mixture of silica powder with the sintering assistant and nitrogen vacancy producing agent is subjected to nitriding treatment while being kept at 1300°–1400° C. in a nitrogen atmosphere, the nitrided product being then sintered at 1500°–1800° C.

13. A method of producing a sintered body of silicon nitride as defined in claim 2, wherein the sintering assistant is mixed in an amount of 0.1 to 15 mol % in terms of element value and the nitrogen vacancy producing agent is mixed in an amount of 0.5 to 15 mol % in terms of element value.

14. A method of producing a sintered body of silicon nitride as defined in claim 13, wherein the resultant Si powder with the sintering assistant and/or nitrogen vacancy producing agent is subjected to nitriding treatment while being kept at 1300°–1400° C. in a nitrogen atmosphere, the nitrided product being then sintered at 1500°–1800° C.

15. A method of producing a sintered body of silicon nitride as defined in claim 8, wherein the sintering assistant is mixed in an amount of 0.1 to 15 mol % in terms of element value and the nitrogen vacancy producing agent is mixed in an amount of 0.5 to 15 mol % in terms of element value.

16. A method of producing a sintered body of silicon nitride as defined in claim 8, wherein the nitrogen vacancy producing agent is at least one element selected from among Sc, Ni, V, Cr, Mn, Fe, Co, Cu, Ti, Zn, Ga, and Ge, or a compound thereof.

17. A method of producing a sintered body of silicon nitride as defined in claim 13, wherein the nitrogen vacancy producing agent is at least one element selected from among Sc, Ni, V, Cr, Mn, Fe, Co, Cu, Ti, Zn, Ga, and Ge, or a compound thereof.

18. A method of producing a sintered body of silicon nitride as defined in claim 8, wherein the sintering assistant and/or nitrogen vacancy producing agent is an oxide, nitride, carbide, alkoxide, stearate, or laurate of any such element as aforementioned.

19. A method of producing a sintered body of silicon nitride as defined in claim 13, wherein the sintering assistant and/or nitrogen vacancy producing agent is an oxide, nitride, carbide, alkoxide, stearate, or laurate of any such element as aforementioned.

* * * * *